C. B. LEWIS.
Fifth-Wheel.

No. 213,291. Patented Mar. 18, 1879.

WITNESSES
Ed. J. Nothingham
A. W. Bright.

INVENTOR
Charles B. Lewis.
By Leggett and Leggett,
ATTORNEYS

UNITED STATES PATENT OFFICE.

CHARLES B. LEWIS, OF DOYLESTOWN, OHIO.

IMPROVEMENT IN FIFTH-WHEELS.

Specification forming part of Letters Patent No. 213,291, dated March 18, 1879; application filed March 26, 1878.

*To all whom it may concern:*

Be it known that I, CHARLES B. LEWIS, of Doylestown, in the county of Wayne and State of Ohio, have invented certain new and useful Improvements in Fifth-Wheels; and I do hereby declare the following to be a full, clear, and exact description of the invention, such as will enable others skilled in the art to which it pertains to make and use it, reference being had to the accompanying drawings, which form part of this specification.

My invention relates to fifth-wheels for wagons and other vehicles.

Figure 1:
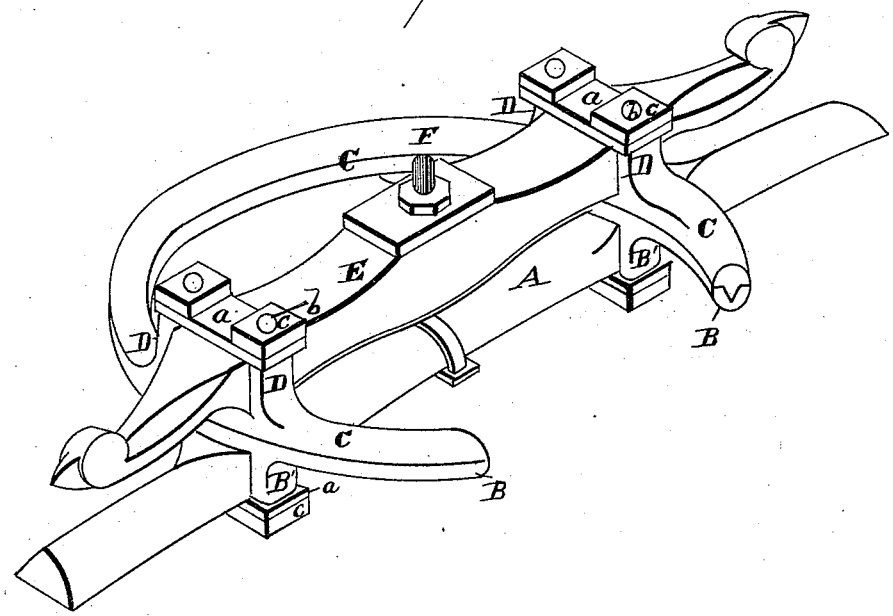
Figure 2:
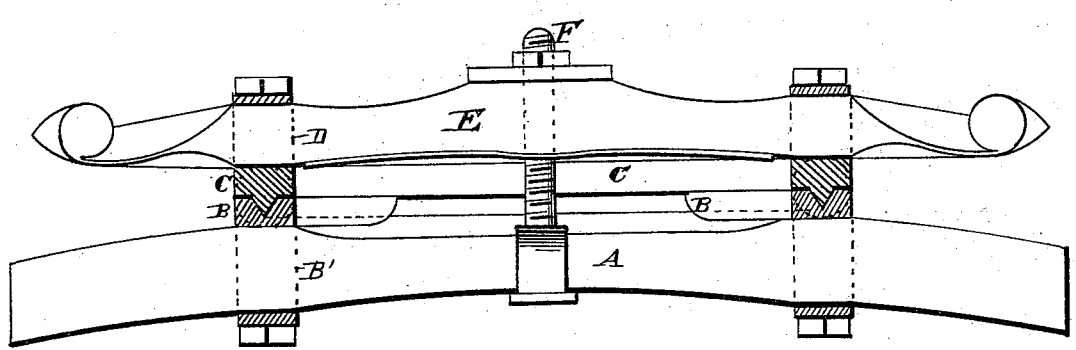

In the drawings, Figure 1 represents an isometric perspective view of my device, and Fig. 2 a view in cross-section of the same on a line taken longitudinally through the head-block.

A represents the axle of the vehicle, to which the nether section, B, of the fifth-wheel is attached by means of clips B'. C is the upper section of the fifth-wheel.

It will be seen that the upper and nether sections, B C, are united by a V-shaped tongue-and-groove arrangement. By this provision the sections B C are not only securely held against lateral displacement, but they are well adapted to contain and retain any lubricant applied to the parts. Moreover, this peculiar conformation of tongue and groove insures a minimum amount of friction, an equality of wear, and the flat surfaces on either side of said tongue and groove offer sufficient vertical bearing to the vehicle-body above it.

Another advantage of this mode of construction is its cheapness over other devices of which I am aware.

The upper and lower sections of the fifth-wheel have the clips D B', formed solid therewith. Said clips are provided with screw-threaded shanks *b*, by means of which the cross-plates *a* are securely held in place by the nuts *c*. This construction of parts dispenses with additional bolts for securing the sections of the fifth-wheel to the head-block and axle, which is necessitated when the fifth-wheel sections are simply provided with lugs for preventing the lateral displacement of the axle or head-blocks.

By this construction it will readily appear how easily the head-block may be removed for purposes of repair or renewal; and in this connection it will also appear that my entire device is well adapted for rapid and easy removal and renewal of any of its parts.

F is the usual king-bolt, which may be of any desired kind or description.

I am aware that, broadly considered, a V-shaped joint between the upper and nether sections of a fifth-wheel is a well-known device; but in none of this class of inventions have I discovered the feature which distinguishes mine, and which makes it, in several respects, an improvement over its precedents. I refer to the flat or horizontal bearing with which I provide both sections upon each side of the V-shaped joint. By this construction I not only secure an easy and firm union of parts, but in operation I find it better adapted for retaining a lubricant, and more certain to exclude dust and dirt, than any prior device of which I am aware. I therefore do not pretend to be the inventor of a V-shaped joint between fifth-wheel sections; but

What I claim is—

A fifth-wheel, one of whose sections has its bearing-surface formed of a V-shaped middle portion, with flat or horizontal faces on each side of said V-shaped portion, and the other or opposing section formed in counterpart thereof, substantially as and for the purpose shown.

In testimony whereof I have signed my name to this specification in the presence of two subscribing witnesses.

CHARLES B. LEWIS.

Witnesses:
F. TOUMEY,
W. E. DONNELLY.